United States Patent
Benz et al.

(10) Patent No.: US 6,566,417 B2
(45) Date of Patent: *May 20, 2003

(54) CONTACT LENS HAVING IMPROVED DIMENSIONAL STABILITY

(75) Inventors: Patrick H. Benz, Sarasota, FL (US); Jose A. Ors, Sarasota, FL (US)

(73) Assignee: Benz Research and Development Corporation, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/870,717

(22) Filed: Jun. 1, 2001

(65) Prior Publication Data

US 2002/0055551 A1 May 9, 2002

Related U.S. Application Data

(60) Division of application No. 09/440,368, filed on Nov. 15, 1999, now Pat. No. 6,265,465, which is a continuation of application No. 08/674,275, filed on Jul. 1, 1996, now Pat. No. 6,011,081, which is a continuation-in-part of application No. 08/421,887, filed on Apr. 14, 1995, now Pat. No. 5,532,289.

(51) Int. Cl.[7] ............................ G02C 7/04; C08F 220/28
(52) U.S. Cl. .................. 523/106; 526/320; 351/160 R; 351/160 H; 351/177
(58) Field of Search ................................. 523/106, 108; 351/106, 177, 160 R, 160 H; 526/320

(56) References Cited

U.S. PATENT DOCUMENTS

| 3,220,960 | A |  | 11/1965 | Wichterle, et al. |
| 3,503,942 | A |  | 3/1970 | Seiderman |
| 3,639,524 | A |  | 2/1972 | Seiderman |
| RE27,401 | E |  | 6/1972 | Wichterle, et al. |
| 3,721,657 | A |  | 3/1973 | Seiderman |
| 3,767,731 | A |  | 10/1973 | Seiderman |
| 3,792,028 | A |  | 2/1974 | Seiderman |
| 3,876,581 | A |  | 4/1975 | Neogi |
| 3,947,401 | A |  | 3/1976 | Stamberger |
| 3,957,362 | A |  | 5/1976 | Mancini, et al. |
| 3,966,847 | A |  | 6/1976 | Seiderman |
| 3,985,697 | A |  | 10/1976 | Urbach |
| 3,988,274 | A |  | 10/1976 | Masuhara et al. |
| 4,028,295 | A |  | 6/1977 | Loshaek |
| 4,038,264 | A |  | 7/1977 | Rostoker et al. |
| 4,056,496 | A |  | 11/1977 | Mancini et al. |
| 4,267,295 | A |  | 5/1981 | Gallop et al. |
| 4,275,183 | A |  | 6/1981 | Kuzma |
| 4,303,066 | A |  | 12/1981 | D'Andrea |
| 4,361,657 | A |  | 11/1982 | Atkinson et al. |
| 4,379,864 | A |  | 4/1983 | Gallop et al. |
| 4,401,797 | A |  | 8/1983 | Gallop |
| 4,495,313 | A |  | 1/1985 | Larsen |
| 4,534,916 | A |  | 8/1985 | Wichterle et al. |
| 4,543,371 | A |  | 9/1985 | Gallop et al. |
| 4,634,722 | A |  | 1/1987 | Gallop |
| 4,733,959 | A |  | 3/1988 | Claussen et al. |
| 4,743,106 | A |  | 5/1988 | Novicky |
| 4,818,801 | A |  | 4/1989 | Rice et al. |
| 4,857,072 | A |  | 8/1989 | Narducy et al. |
| 4,861,152 | A |  | 8/1989 | Vinzia et al. |
| 4,861,850 | A |  | 8/1989 | Novicky |
| 4,883,659 | A |  | 11/1989 | Goodman et al. |
| 5,406,341 | A |  | 4/1995 | Blum et al. |
| 5,938,795 | A | * | 8/1999 | Molock et al. ................ 8/507 |
| 6,242,508 | B1 | * | 6/2001 | Benz .......................... 523/106 |

FOREIGN PATENT DOCUMENTS

| JP | 4114016 | 5/1992 |
| JP | 6-88949 | 3/1994 |

OTHER PUBLICATIONS

H. Yasuda, et al., Hydrogels of Poly(hydroxyethyl and Hydroxyethyl Methacylate–Glycerol Monomethaerylate Copolymers, *Journal of Polymer Science*, Part A–1, pp. 2913–2927 (1966).

M. Macret, et al., Hydroxyalkyl methacrylates: Kinetic investigations of radical . . . , *Polymer*, 1982, vol. 23, Jan., pp. 81–90.

W. Eng, et al., The Wearing of Hydrophilic Contact Lenses Abroad a Commercial Jet Aircraft: I. Humidity Effects on Fit, *Aviation, Space and Environmental Medicine*, Mar., 1982, pp. 235–238.

M. Macret, et al., Hydroxyalkyl methacrylates; hydrogel formation based on the radical . . . , *Polymer*, 1982, vol. 23, May, pp. 748–753.

B. McCrary, et al., pH, Osmolarity and Temperature Effects on the Water Content of Hydrogel Contact Lense, *Contact and Intraocular Lens Medical Journal*, vol. 8, No. 3, Jul.–Sep. 1982, pp. 158–167.

D. Helton, et al., Hydrogel Contact Lens Dehydration Rates Determined by Thermogravimetric Analysis, *The CLAO Journal*, vol. 17, No. 1., Jan. 1991, pp. 59–61.

U. Businger, GMA/HEMA: First Report on a Clinical Trial, *Spectrum*, Aug. 1995, pp. 19–25.

Benz RX Contact Lenz Materials; Manufacturing and Technical Manual–Apr. 1992.

Benz RX Contact Lenz Materials; Manufacturing and Technical Manual–Sep. 1992.

Benz RX Contact Lenz Materials; Manufacturing and Technical Manual–Apr.1993.

Benz RX Contact Lenz Materials; Manufacturing and Technical Manual–Apr. 1994.

* cited by examiner

Primary Examiner—Tae H. Yoon
(74) *Attorney, Agent, or Firm*—Foley & Lardner

(57) ABSTRACT

A contact lens and a contact lens blank having increased dimensional stability are constructed from a copolymer of 2,3-dihydroxypropyl methacrylate and 2-hydroxyethyl methacrylate, wherein the copolymer of 2,3-dihydroxypropyl methacrylate and 2-hydroxyethyl methacrylate has either an absolute water balance ratio greater than 8 or a relative water balance ratio greater than 2 relative to a polymer of 2-hydroxyethyl methacrylate.

20 Claims, 8 Drawing Sheets

CONTACT LENS HAVING IMPROVED DIMENSIONAL STABILITY

CROSS-REFERENCE TO RELATED APPLICATION

This application is a divisional application of U.S. Ser. No. 09/440,368 filed Nov. 15, 1999, now U.S. Pat. No. 6,265,465, which is a continuation of U.S. Ser. No. 08/674,275 filed Jul. 1, 1996, now issued as U.S. Pat. No. 6,011,081, which is a continuation-in-part of U.S. Ser. No. 08/421,887 filed Apr. 14, 1995, now issued as U.S. Pat. No. 5,532,289.

BACKGROUND OF THE INVENTION

The present invention relates to a contact lens having improved dimensional stability, a contact lens blank having improved dimensional stability and, more particularly, relates to a spheric contact lens, a toric contact lens, a multifocal contact lens, and a contact lens blank constructed from a copolymer of 2,3-dihydroxypropyl methacrylate and 2-hydroxyethyl methacrylate, and having either an absolute water balance ratio greater than 8 or a relative water balance ratio greater than 2 relative to a polymer of 2-hydroxyethyl methacrylate.

The prior art describes many polymers, based on acrylates or methacrylates, for use in contact lenses. For instance, U.S. Pat. No. 4,056,496 to Mancini et al. discloses a hydrogel formed by bulk polymerization of a dihydroxyalkyl acrylate or methacrylate, such as GMA; an alkyl acrylate or methacrylate; and a minor amount of an epoxidized alkyl acrylate or methacrylate. Additionally, U.S. Pat. No. 3,985,697 to Urbach teaches terpolymer hydrogels formed from hydroxyalkyl acrylate or hydroxyalkyl methacrylate, a non-water-soluble acrylate or methacrylate diester as a cross-linking agent, and an alkenoic carboxylic acid, such as acrylic or methacrylic acid. U.S. Pat. No. 3,947,401 to Stamberger discloses a bulk-polymerized water-insoluble, but water-swellable, copolymer formed from a polymerizable monoester of acrylic or methacrylic acid, such as 2-hydroxyethyl methacrylate (HEMA), and glycidyl methacrylate. Macret et al. in *Polymer*, 23(5), 748–753 (1982) discloses hydrogels prepared by radical polymerization of 2,3-dihydroxypropyl methacrylate and 2-hydroxyethyl methacrylate, but this document neither discloses nor suggests a contact lens having improved dimensional stability or superior water balance.

Conventional non-ionic hydrogels constructed from methyl methacrylate (MMA) copolymers derive their strength from the methacrylate polymer backbone, but depend upon the pendant hydrophilic groups of the comonomers for water content. An exemplary hydrophilic comonomer is N-vinylpyrrolidone (NVP). The structure and amount of these hydrophilic components are limited by their compatibility with the hydrophobic MMA.

HEMA-based hydrogels have a hydrophilic core that permits a water content of 38%. Higher water contents are achieved by inclusion of either methacrylic acid (MAA) comonomer in ionic hydrogels, or hydrophilic cononomers in non-ionic systems. NVP has been a key monomer in attaining water contents up to 70%, but use of this comonomer results in temperature sensitivity during manufacturing. Moreover, progressive yellowing with age and changes in optical parameters as a result of temperature-dependent dimensional changes have also been observed with lenses constructed from these compositions.

The ability of a hydrogel lens to maintain its water-saturated state is essential for maximum lens stability. All hydrogel lenses dehydrate, for water evaporates continuously from the surface of a hydrogel lens. Dehydration of a contact lens results in a change in the dimensions of the lens, hence dehydration has a direct effect upon dimensional stability. Conventional contact lenses undergo a significant degree of dehydration during use and, accordingly, have a significant degree of dimensional instability, particularly at higher water contents.

Further, rehydration is important to the dimensional stability of a contact lens. If a lens material can be constructed which absorbs water more rapidly, then the lens will more closely return to a water-saturated state during each blink, when the lens is bathed in tear fluid. Therefore, as a lens begins to dehydrate, a characteristic of rapid rehydration is extremely advantageous for maintaining saturation and maximum stability. Unfortunately, conventional contact lens development either has ignored the effect of rehydration rate upon lenses or has constructed lenses of materials with a less than optimal rate of rehydration.

As such, there remains a need for a contact lens possessing superior dimensional stability and having a low rate of dehydration coupled with a high rate of rehydration.

SUMMARY OF THE INVENTION

Accordingly, an object of the present invention is to provide a novel contact lens and contact lens blank having improved dimensional stability.

Another object of the present invention is to provide a spheric contact lens, a toric contact lens, and a multifocal contact lens, each having superior dimensional stability.

Another object of the present invention is to provide a contact lens and a contact lens blank, each with a low rate of dehydration coupled with a high rate of rehydration, relative to lenses currently available.

Still another object of the present invention is to provide a contact lens and a contact lens blank, each with a superior water balance, or ratio of dehydration to rehydration.

These objects, among others, have been accomplished by means of a contact lens and a contact lens blank constructed from a copolymer of 2,3-dihydroxypropyl methacrylate (glyceryl methacrylate hereinafter referred to as "GMA") with 2-hydroxyethyl methacrylate ("2-HEMA"). In addition, these objects, among others, have been accomplished by means of a contact lens and a contact lens blank constructed from a copolymer of 2,3-dihydroxypropyl methacrylate and 2-hydroxyethyl methacrylate having an absolute water balance ratio greater than 8. Still further, these objects, among others, have been accomplished by means of a. contact lens and a contact lens blank constructed from a copolymer of 2,3-dihydroxypropyl methacrylate and 2-hydroxyethyl methacrylate that has a relative water balance ratio greater than 2 relative to a polymer of 2-hydroxyethyl methacrylate (p-HEMA).

In contrast to recent developments in rigid gas permeable contact lenses, no significant improvement has been achieved recently in hydrophilic contact lenses. All hydrophilic lenses introduced in recent years have been based on either existing materials employing new production technology or slight modifications of known compositions. This lack of progress in the soft lens field has resulted in a large variety of lens designs, but a narrow choice of lens materials and a narrow range of lens stabilities as measured by water balance ratio.

Limited choice in lens material is problematic when attempting to fit contact lenses on patients subject to a wide variety of physiological and environmental conditions. For example, an array of factors affect contact lens comfort and stability, such as, tear quantity, ambient humidity, prolonged open eye periods, and air flow around the eye. Especially difficult cases are posed by patients with dry eyes.

The dehydration of hydrophilic lenses is a major problem, affecting lens movement, lens power, oxygen permeability and comfort. Various factors including patient physiology, environment, lens design, and lens material significantly influence the rate of dehydration, as described in Andrasko, *Hydration Levels and Oxygen Transmissivities of Ophthalmic Polymer In Situ*, Thesis, Ohio State University, 1980, and McCarey et al. pH, Osmolarity and Temperature Effects on the Water Content of Hydrogel Contact Lenses, *Contact and Intraocular Lens Medical Journal* 8, 158–167, 1982. Thicker lenses also appear to dehydrate less than thinner lenses, as described in Businger et al., Die Beeirflussung der Dehydratation von hydrophilen Kontaktlinsen durch verschiedene Linsenparameter, *Deutsche Optiker Zeiturig* 40, 99–102 (1985).

While a variety of hydrophilic lens materials are available, they differ only slightly in their rates of dehydration, as described in Helton et al., Hydrogel Contact Lens Dehydration on Rates Determined by Thermogravimetric Analysis *CLAO* 17, 59–61 (1991). These factors are particularly pronounced during the cold season or in dry environments, see Andrasko et al., The Effect of Humidity on the Dehydration of Soft Contact Lenses on the Eye, *Int. Cl. Clinic* 7, 30 (1982) and Eng et al., The Wearing of Hydrophilic Contact Lenses Aboard a Commercial Jet Aircraft: 1Humidity Effects on Fit, *Aviat. Space Environ. Med.* 53, 235 (1982).

Conventional materials containing glyceryl methacrylate have been reported to have improved internal water retention over poly-HEMA, see Pescosolido, et al., Nuclear Magnetic Resonance Study of Dehydration in Glycerylmethyl-methacrylate Contact Lens, *Contactologia* 15D, 64 (1993). However, this polymeric material contained MMA as a hydrophobic component, which precludes increasing the water content beyond 38%.

The ability of a hydrogel lens to maintain its saturated state is essential for lens stability. All hydrogel lenses dehydrate. Water evaporates from the surface of a hydrogel lens continuously. The amount of water loss that a lens will experience depends upon the dehydration/rehydration behavior of the particular lens material, the quantity of tears deposited on the lens with each blink, the ambient humidity, temperature and air flow around the eye.

Superior dehydration/rehydration behavior of soft lens materials provides the material with increased dimensional stability. If a soft lens material can be made to dehydrate (allow evaporation) more slowly, then the lens will remain closer to its saturated state. Equally important, but not recognized in the prior art, is the importance of rehydration. If a lens material can be made to re-absorb water more rapidly, then the lens can return to a state closer to saturation during each blink, when the lens is bathed in tear fluid. Thus, an "ideal" soft contact lens is one constructed from a composition that is both slow to dehydrate and quick to rehydrate.

The present inventors undertook a program of research to develop a material composition for soft contact lenses having enhanced dimensional stability and superior water balance ratios (a low rate of dehydration coupled with a high rate of rehydration), both absolute and relative to p-HEMA. They discovered that copolymers of 2,3-dihydroxypropyl methacrylate with 2-hydroxyethyl methacrylate possess a low rate of dehydration coupled with a high rate of rehydration and, accordingly, would furnish contact lenses having enhanced dimensional stability.

Moreover, with the introduction of this material composition, the water content can be increased from 40% up to 70% by weight, depending on the ratio of the comonomers.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
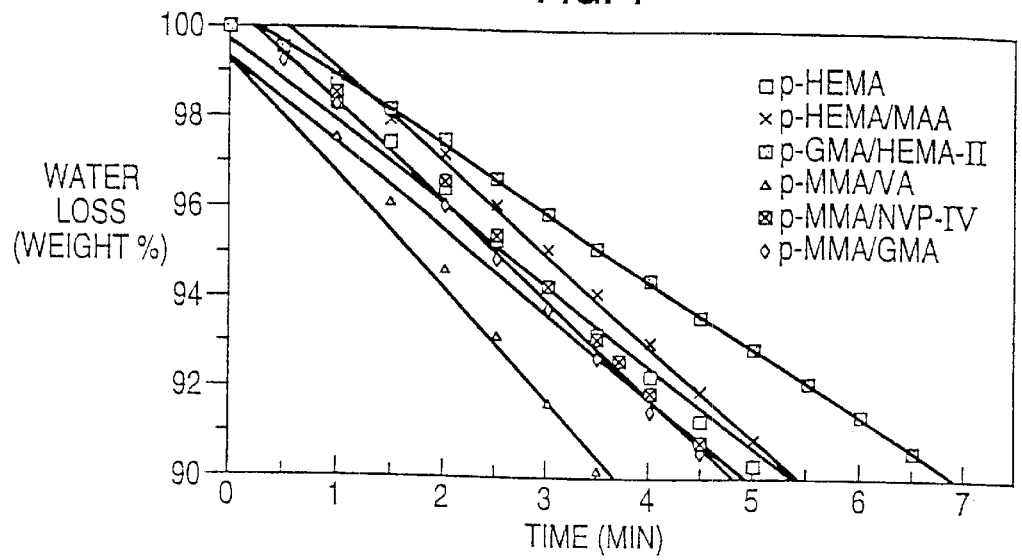
FIG. 1 is a graph illustrating the lens rehydration behavior of various commercially available hydrophilic lenses in in vitro tests conducted at 350 C.

Other features of the invention will become apparent in the course of the following descriptions of exemplary embodiments which are given for illustration of the invention and are not intended to be limiting thereof.

The copolymer is made by any known method of polymerizing GMA with a 2-HEMA comonomer. Suitable polymerization methods are the free radical bulk polymerization methods taught by U.S. Pat. No. 4,056,496 to Mancini et al., U.S. Pat. No. 3,985,697 to Urbach, and U.S. Pat. No. 3,947,401 to Stamberger, all of which are incorporated here by reference. The proportions of the reactants and the reaction conditions can be varied so as to optimize conditions. Suitable catalysts are also taught by the cited U.S. patents incorporated by reference. Known cross-linking agents, as taught in U.S. Pat. No. 4,038,264 to Rostoker et al., which is incorporated herein by reference in its entirety, are used in proportions ascertainable by one skilled in the art.

It is important to the present invention that the GMA be pure and free of impurities such as glycidyl methacrylate and dimethacrylate. Thus, while the GMA is synthesized by the known method as taught by Mancini, it is further purified by vacuum distillation.

As referred to hereinafter, the term "purified by distillation" refers to the process in which GMA is purified by vacuum distillation, in which process impurities such as glycidyl methacrylate and dimethacrylate are removed.

2-HEMA is commercially available and is preferably purified by vacuum distillation as taught by Urbach. The invention contemplates copolymers of GMA and 2-HEMA.

In a preferred embodiment of the present invention, GMA constitutes between 20 mole % and 90 mole % of the copolymer and in a still more preferred embodiment of the present invention, GMA constitutes between 50 mole % and 90 mole % of the copolymer.

The polymers of the present invention are copolymers of GMA which have been purified by vacuum distillation. The copolymers contain, as comonomers, 2-HEMA and GMA.

A hydrogel is formed from the polymers in a known manner, whether by polymerizing the monomers in bulk, in an aqueous solvent, or in an organic solvent and hydrating the polymer after polymerization. The composition has a water content ranging from about 40% to about 70%. Table I shows the water content of some of the polymers according to the present invention having various proportions of the monomers shown (any water content from 40% to 70% is readily formulated).

A contact lens blank is a rough piece of optical material of suitable size, design and composition for use, when ground and polished, as contact lenses. Contact lens blanks, either constructed from a copolymer of GMA with 2-HEMA, having an absolute water balance ratio greater than 8, or having a relative water balance ratio greater than 2 relative to p-HEMA, are intended to comprise aspects of the instant invention.

TABLE I

| HEMA Mole % | GMA Mole % | Water Content Percent By Weight ± 2% |
|---|---|---|
| 80 | 20 | 45 |
| 50 | 50 | 57 |
| 10 | 90 | 68 |

EXAMPLE 1

Preparation of GMA

Glyceryl methacrylate (GMA) can be prepared according to the methods presented in U.S. Pat. No. 4,056,496 to Mancini et al., which is incorporated herein by reference. The resultant GMA can be purified using standard methods, such as, thin film evaporation, distillation, and chromatography. For the present invention, the preferred method of purification of GMA was distillation so as to achieve the purity criteria listed in Table II.

TABLE II

| Purity | Acid Content (MA) | Diester Content (GDMA + EGDMA) | Inhibitor (MEHQ) |
|---|---|---|---|
| 97% minimum | 0.1% maximum | 0.6% maximum | 0.03% maximum |

MA = Methacrylic Acid
GDMA = Glyceryl Dimethacrylate
EGDMA = Ethylene Glycol Dimethacrylate
MEHQ = p-Methoxyphenol

EXAMPLE 2

Preparation of GMA/HEMA Copolymer with 67% Water Content 857.3 grams of GMA were mixed with 142.7 grams of 2-HEMA and 0.6 gram of 2,2-azobis (2,4-dimethylvaleronitrile) were added. The total diester concentration was adjusted to 0.6% by weight with ethylene glycol dimethacrylate. The mixture was degassed by applying vacuum with vigorous stirring. The mixture was dispensed into cylindrical molds, polymerized at 35° C. for 5 hours, and post-cured at 110° C. for 5 hours. The polymer was removed from the molds and then mechanically formed into optical contact lenses. The mechanical formation process comprised cutting the polymer into cylinders approximately 0.5 inch (approximately 1.27 cm.) in diameter and approximately 0.2 inch (approximately 0.508 cm.) in height suitable f or contact lenses. The blanks were then cured at 110° C. for 5 hours. After curing, the blanks were ground and lapped to right cylinders of 0.5 inch in diameter and 0.2 inch in height.

EXAMPLE 3

Preparation of GMA/HEMA Copolymer with 57% Water Content 551.7 grams of GMA were mixed with 448.3 grams of 2-HEMA and 0.6 gram of 2,2-azobis (2,4-dimethylvaleronitrile) was added. The total diester concentration was adjusted to 0.6% by weight with ethylene glycol dimethacrylate. The mixture was degassed by applying vacuum with vigorous stirring. The mixture was dispensed into cylindrical molds, polymerized at 35° C. for 5 hours, and post-cured at 110° C. for 5 hours. The polymer was removed from the molds and then mechanically formed into optical contact lenses. The mechanical formation process comprised cutting the polymer into cylinders approximately 0.5 inch (approximately 1.27 cm.) in diameter and approximately 0.2 inch (approximately 0.508 cm.) in height suitable for contact lenses. The blanks were then cured at 110° C. for 5 hours. After curing, the blanks were ground and lapped to right cylinders of 0.5 inch in diameter and 0.2 inch in height.

EXAMPLE 4

Preparation of GMA/HEMA Copolymer with 45% Water Content 246.5 grams of GMA were mixed with 753.5 grams of 2-HEMA and 0.6 gram of 2,2-azobis (2,4-dimethylvaleronitrile) was added. The total diester concentration was adjusted to 0.6% by weight with ethylene glycol dimethacrylate. The mixture was degassed by applying vacuum with vigorous stirring. The mixture was dispensed into cylindrical molds, polymerized at 35° C. for 5 hours, and post-cured at 110° C. or 5 hours. The polymer was removed from the molds and then mechanically formed into optical contact lenses. The mechanical formation comprised cutting the polymer into cylinders approximately 0.5 inch (approximately 1.27 cm.) in diameter and approximately 0.2 inch (approximately 0.508 cm.) in height suitable for contact lenses. The blanks were then cured at 110° C. f or 5 hours. After curing, the blanks were ground and lapped to right cylinders of 0.5 inch in diameter and 25 0.2 inch in height.

A study was conducted to determine the dehydration and rehydration behavior of lenses of similar thicknesses constructed from a variety of materials. Table III lists various polymer compositions and their nominal water content. In this table, the prefix "p" designates a polymer constructed from the monomer or coinonomers indicated.

TABLE III

| Lens Material | Nominal Water Content (%) | Lens Material | Nominal Water Content (%) |
|---|---|---|---|
| p-HEMA | 38 | p-MMA/NVP--1 | 58 |
| p-GMA/MMA | 38 | p-MMA/NVP-II | 52 |
| p-GMA/HEMA-I | 45 | p-MMA/NVP-III | 63 |
| p-GMA/HEMA-II | 57 | p-MMA/NVP-IV | 68 |
| p-GMA/HEMA-III | 68 | p-MMA/NVP-V | 69 |
| p-HEMA/MAA | 50 | p-MMA/VA | 64 |
| pMEMA/NVP-II | 52 | | |
| p-HEMA/NVP-I | 55 | | |

Dehydration experiments were carried out in a thermogravimetric analysis instrument which measures small changes in weight. All samples were run under identical conditions. p-HEMA was run as a standard with every sample set. The results are graphically presented in FIG. 1, which compares a GMA/2-HEMA-II contact lens of the present invention with conventional materials of the same thickness.

The rate of dehydration is indicated for the first 10% of weight loss from saturation, because this, initial loss is of the greatest physiological importance. Isothermal conditions at 35° C. were chosen to approximate physiological milieu. The slower dehydration rate in the GMA/2-HEMA copolymer is apparent, even compared with polymeric compositions of higher water content.

The rate of rehydration of a contact lens after partial dehydration is of particular importance, because the time that a lens has to rehydrate over its entire surface is that of a blink or possibly a few blinks in succession. The lens has only a few seconds, at most, in which to bathe in tear fluid. A lens composition material with rapid rehydration behavior would be advantageous for maintaining a state of saturation, or near saturation, through the wearing cycle of the lens, and would, therefore, maintain its saturated dimensions.

Figure 2:
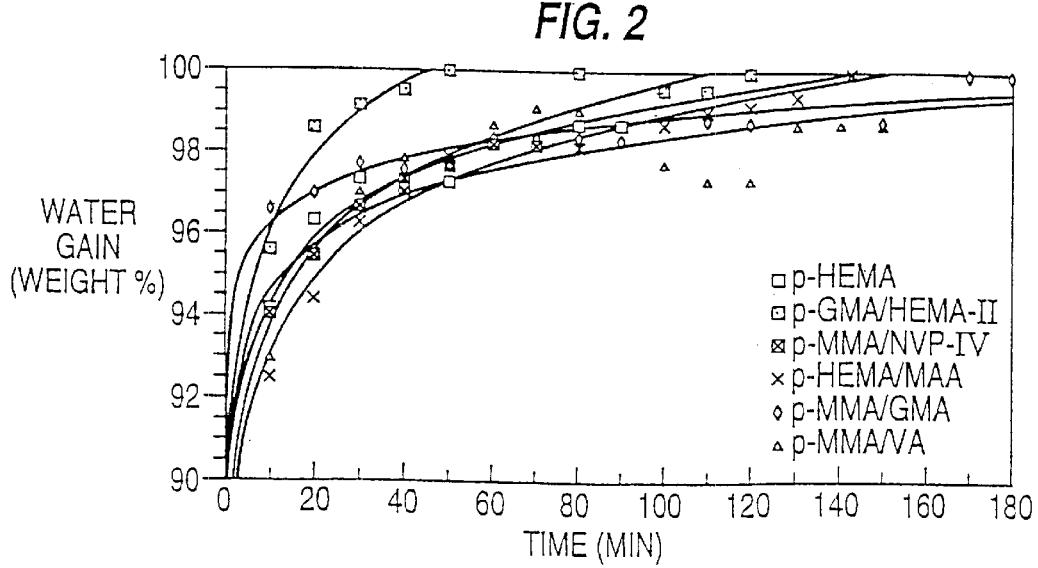
FIG. 2 is a graph depicting the lens rehydration behavior of various commercial lenses of 0.1 mm. wet thickness dehydrated by 10% of their original saturation weight.

FIG. 2 graphically illustrates the rehydration behavior of lenses of the same thickness (0.1 mm wet thickness) of various compositions. The data were obtained using gravimetric analysis to measure weight gain after immersion in borate buffer saline solution. Again, the graph shows rehydration of lenses that had been dried to 90% of their saturated weight. Note that GMA/2-HEMA lenses have the fastest rehydration rate and the shortest time-to-saturation of the lenses examined.

Copolymers of 2,3-dihydroxypropyl methacrylate and 2-hydroxyethyl methacrylate show the fastest rehydration behavior and the shortest time-to-saturation of any soft lens material. This rapid rehydration behavior, when combined with their slow dehydration rates, allows these materials to maintain a hydrated state much closer to saturation during the entire wearing cycle relative to conventional contact lens compositions. This "hydro-equilibrium" is termed "water balance".

Figure 3:
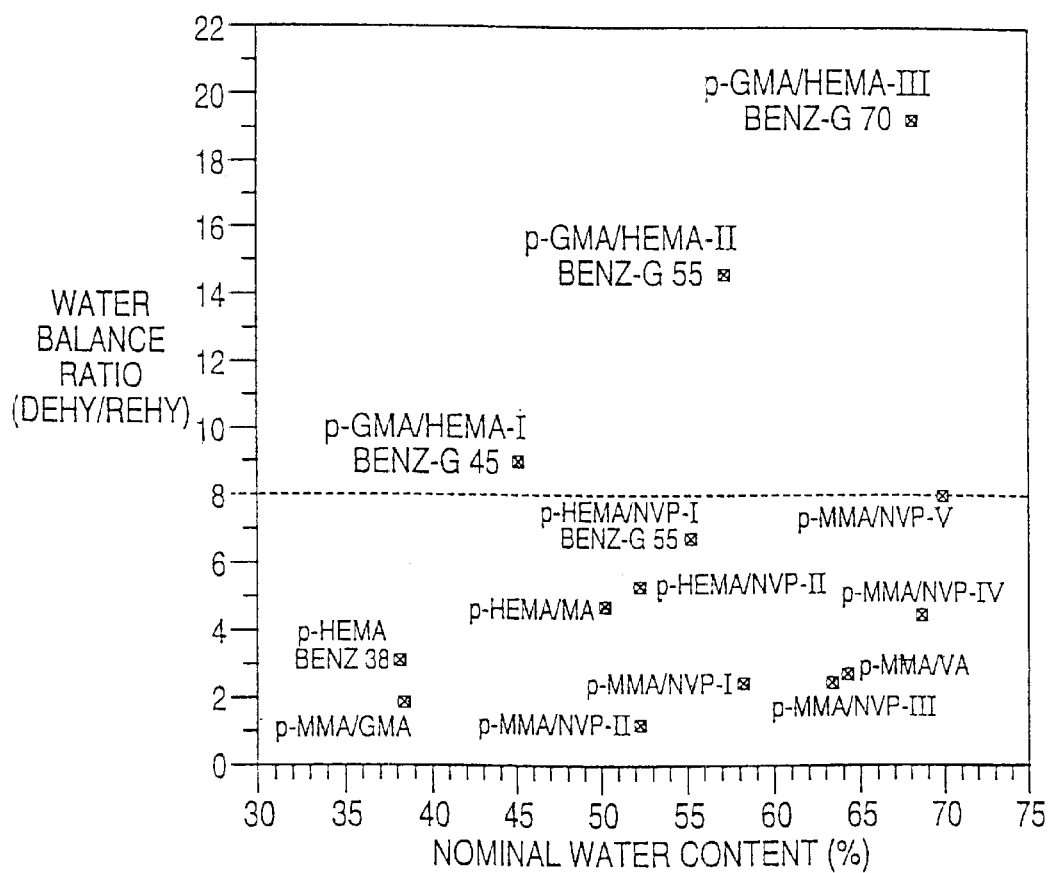
FIG. 3 is a graph illustrating a comparison of the absolute water balance ratio with the nominal water content of various polymers, including those of the present invention.

"Water balance" is an inherent property dependent on the material's ability to bind water and can be examined by the rates of dehydration and rehydration. The ratio of these two parameters serves as a guide to lens stability and comfort. FIG. 3 compares the in vitro performance of various commercial materials. The data shown are based on the ratio of the time it takes a lens (0.1 mm hydrated constant thickness) to lose 10% of its weight as water from its saturated state to the time it takes to re-saturate. The graph shows the absolute water balance ratio plotted against nominal water content for each material.

With this integration of glyceryl methacrylate and 2-HEMA, new copolymers with a water content in the range from 40 to 70% can be synthesized. Lenses from the new material showed good strength, fine handling and excellent water retention properties.

Figure 4:
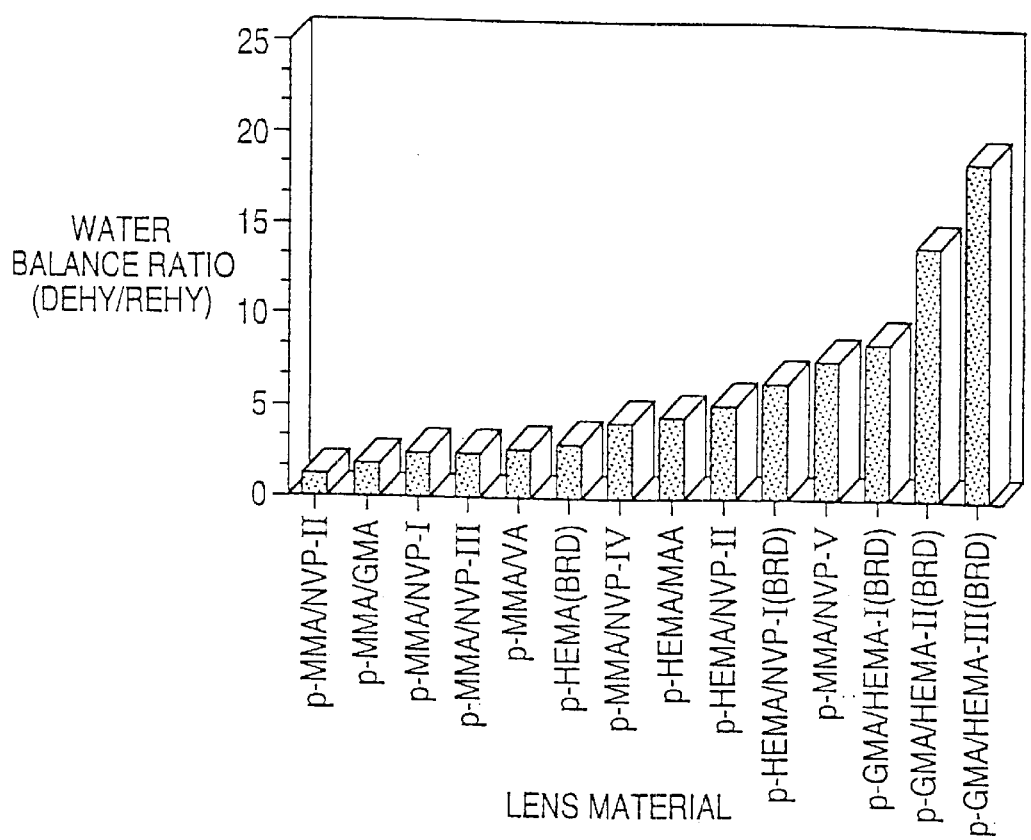
FIG. 4 is a chart depicting a comparison of the absolute water balance ratio of various polymers, including those of the present invention.

This copolymer of GMA/2-HEMA material remains, even in vivo, closer to the water-saturation point than any other material currently available. This result is provided in FIG. 4.

A clinical study was established to determine if the laboratory findings result in enhanced performance with patients and if patients with marginal dry eyes would benefit from lenses constructed from GMA/2-HEMA copolymer.

Thirty patients, who were previously diagnosed as having marginal dry eyes were fitted with lenses made out of GMA/HEMA. The criteria for marginal dry eyes was set either by a non-invasive breakup time between 10 to 20 seconds as measured with a tear scope or by fluorescein staining greater than grade 1 during normal wear time with conventional soft contact lenses; which staining could not be reduced by varying the lens design.

During the study, only one eye was fitted with a lens of GMA/HEMA, while the other eye was fitted with 'a conventional lens as a control. All lenses constructed of GMA/2-HEMA had a continuous offset bi-curve design with a 11.25 mm back optical zone and an overall diameter of 14.0 mm. The lenses had a center thickness of 0.12 mm. The lenses used as control were made out of VP/MMA, VA/MMA, or 2-HEMA. Except for the lenses made out of 2-HEMA and VP/MMA, all other lenses had a similar center thickness as the test lenses.

Patients who were previous contact lens wearers used the same care system as they were using before. All new fitted patients were using Oxysept Comfort (Allergan), a peroxide system that leaves the lens at the end of the disinfection cycle in unpreserved saline.

Figure 5:
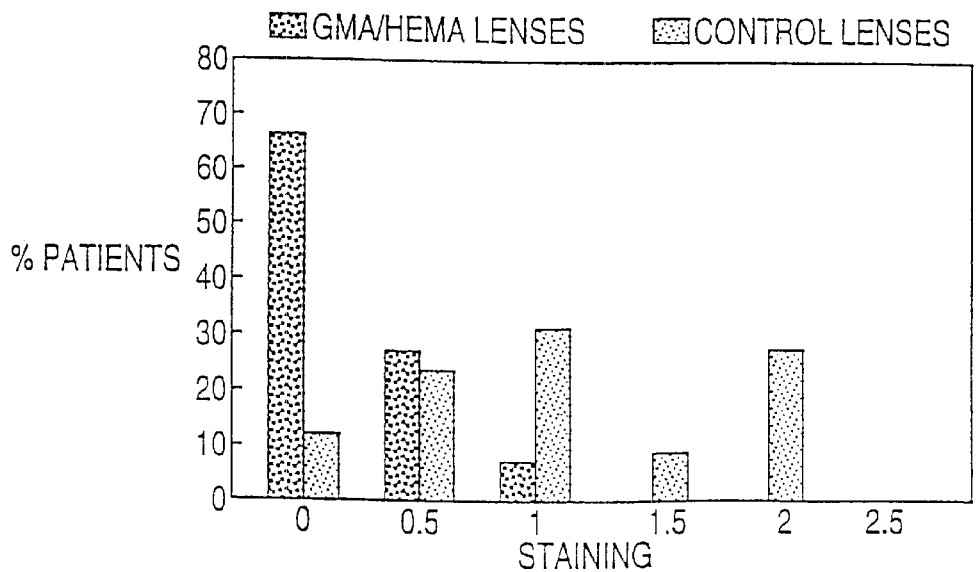
FIG. 5 is a chart illustrating the staining behavior of lenses of the present invention with conventional lenses.

Lens performance was evaluated by visual acuity, staining of the cornea, hyperaemia of the conjunctiva, ophthalmometer reading, refraction, wearing time, and subjective rating of lens comfort and stability of visual acuity. Staining was evaluated by slitlamp observation using a yellow filter to enhance the appearance, and was graded by intensity and extension. The clinical data is provided in FIG. 5.

The subjective rating was rated by whole numbers ranging from 1 to 5, with 5 representing a very comfortable lens with no irritation and 1 representing intolerable irritation. When patients were asked to select their preferred lens, they could choose between the test lens, the control lens, or indicate no preference.

For the purpose of evaluation the findings at the three month visit were used. Of the 30 patients fitted with lenses made out of GMA/2-HEMA material, 20. patients had a non-invasive breakup time of 20 or less seconds and 10 were previously wearing lenses that caused more than grade 1 staining and could not be reduced by changing to a different lens design or/and lens material. After wearing the test lens in one eye for at least three months the staining was reduced to at least 1, in all cases where previously a different lens was worn on the same eye. When the staining of two eyes were compared, the average eye with the lens constructed of GMA/2-HEMA measured 0.2 relative to a measurement of 0.88 with the eye that was wearing a different lens. No corneal or conjunctival problems were observed by slitlamp observation. The visual acuity was, in all cases, the same or slightly better when compared with that observed with previously worn lenses on the same eye. Many patients commented about the more stable acuity obtained with the new lens, particularly during intensive near tasks (VDT tasks).

Figure 6:
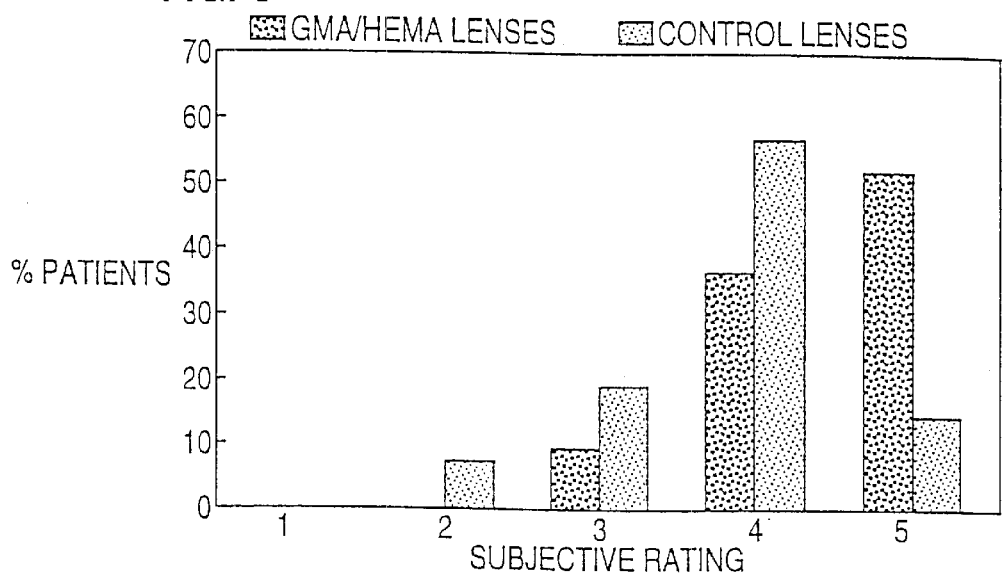
FIG. 6 is a chart depicting the subjective rating of lenses of the present invention with conventional lenses.

The subjective rating of the GMA/2-HEMA lens by the patients, on a scale from 1 to 5, showed 53.3% rated the lens at 5 and 36.7 rated the lens at 4, as compared with the rating of the conventional lens in the other eye, which was rated at 5 by 15.4% of the patients and at 4 by 57.7%. Wearing time, for all patients and all lens types, was 12 hours or more. When the overall satisfaction of the lens made out of GMA/2-HEMA was compared to the lens worn on the other eye, 69.2% preferred the GMA/2-HEMA lens and only 11.6% chose the lens on the other eye as the better lens, 19.2% remained undecided. This clinical data is provided in FIG. 6.

Figure 7:
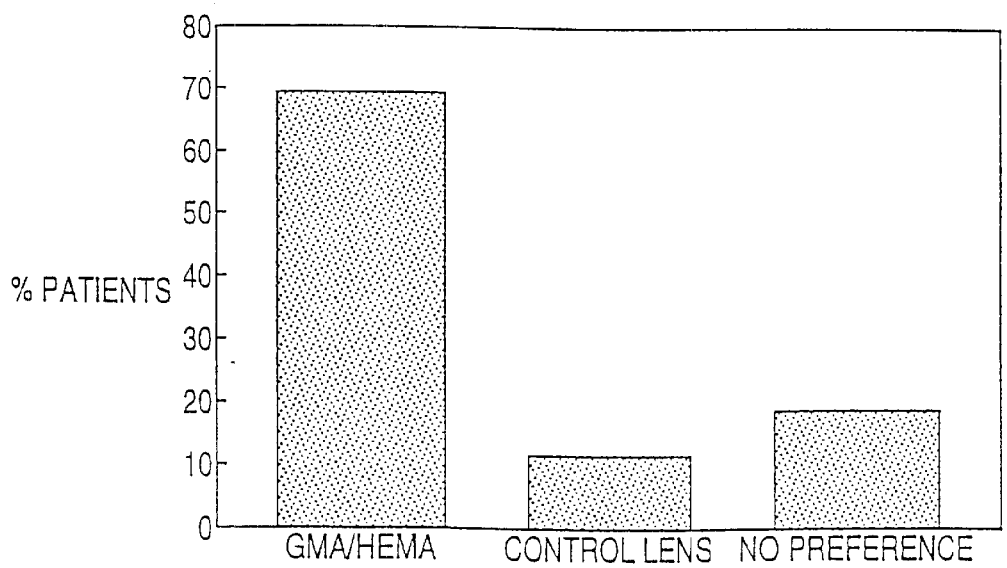
FIG. 7 is a chart illustrating the lens preference of subjects, when choosing between lenses of the present invention and conventional lenses.

At the conclusion of the clinical trial, 26 of the 30 patients chose to be fitted with GMA/2-HEMA lenses on both eyes because of reduced staining and/or more stable acuity. This clinical data is provided in FIG. 7.

Moreover, there were no changes in appearance from the initial findings 10 days after fitting of the lens up to the three month visit.

An interesting finding was the more stable acuity during intensive near tasks. When patients were further questioned if they felt dryness during, their work on VDT, they often reported that they felt the dryness but within a few complete blinks that feeling was gone in the eye having the GMA/2-HEMA lens, while dryness remained in the eye with the control lens. It was also observed during the evaluation of the new lens material that only a short time was required for the GMA/2-HEMA lens to settle. After a few minutes of lens wear, movement and rotation of this lens reached a stable state that did not change even after several hours.

Compared to the lens parameters that have been employed in conventional lens design, it was striking that lenses could be fitted steeper than previously and still showed better movement after several hours of lens wear. This is because of the unusual dimensional stability of the lenses. This results in less chair time for the patient and greater predictability about lens movement and rotation after only a few minutes on the eye during the initial fitting.

Determination of Water Balance Ratio in Lenses

Gravimetric techniques were employed to measure the water balance of hydrogel lenses. Water balance is defined as the ratio of the time it takes a lens to dehydrate by 10% of its water weight and the time it takes to return to its initial hydrated weight from 10% of its dehydrated water weight (saturation). Relative values were reported relative to p-HEMA (commercially available as Polymacon with a water content of 38% by weight), which was employed as a control.

The ambient conditions for the water balance ratio test were (and should) be constant for all the test lenses and control. These conditions must be measured accurately and the measuring equipment must be calibrated against accepted standards. The specified conditions are 21°±2° C. and 50±3% relative humidity. The test equipment employed was a high precision, calibrated balance (such as Sartorius, Mettler, etc.) with 0.0001 gram accuracy. The balance was placed in a controlled temperature and relative humidity environment of 21±2° C. and 50±3% relative humidity. The balance should be tared to include the weight of the wire used to hold the lens and that mass value established as the zero point.

Fabrication of Sample Lenses:

For each material, dry, constant-thickness lenses were cut, based on expansion factors, to yield a final wet, constant-thickness lens of 0.10±0.01 mm, having a diameter of 14.0 mm. To facilitate lens holding by the wire, a small hole was introduced into the lens during dry stage fabrication. Finished dry lenses were cleaned and hydrated overnight in buffered saline solution. The BENZ buffered saline solution is composed of 8.01 grams NaCl, 2.47 grams of $H_3BO_3$, and 0.14 grams $Na_2B_4O_7 \cdot OH_2O$ in 1 liter of distilled water, with a pH of 7.26 and an osmolarity of 295 mOs at 22.5° C.

EXAMPLE 5

Preparation of a GMA/2-HEMA Co-polymer Molded Lens with a Water Balance Ratio of 5.8

This example shows the preparation of a GMA/2-HEMA co-polymer molded lens with a water balance ratio of 5.8, as compared to poly-HEMA with a defined water balance ratio of 1.

A monomer mixture was prepared generally as described in Example 3 with the following exceptions:

Exact weights of the following components were mixed:

| | | |
|---|---|---|
| 270 g | GMA | |
| 230 g | 2-HEMA | |
| 0.3 g | 2,2'-azobis (2,4-dimethylvaleronitrile) | |
| 0.2 g | Ethylene Glycol Dimethacrylate | |
| 15.7 g | Water (added as an inert ingredient to facilitate handling of the polymer in a lab with normal humidity (STO % RH) prior to hydration) | |

This mixture was degassed, as described in Example 3, and dispensed into injection molded lens molds having a positive radius of 7.00 mm and a fine optical finish. The filled molds were placed in a heated argon-filled chamber at 45° C. and allowed to polymerize slowly over 13 hours during which time the temperature was slowly increased to 69° C. The resulting polymerized molds were placed in an air oven at 94° C. for one hour and 45 minutes to complete the polymerization. The molded base curve surface was then removed-from the mold and placed on a mandrel using wax. A constant thickness lens was then fabricated as previously described, and the water balance relation to poly-HEMA was determined in accordance with the previously described methods.

Molded lens hydrated dimensions:

| | |
|---|---|
| Diameter | 14.3 mm |
| Thickness | 0.16 mm |
| Water content of the lens | 62% |

Figure 11:
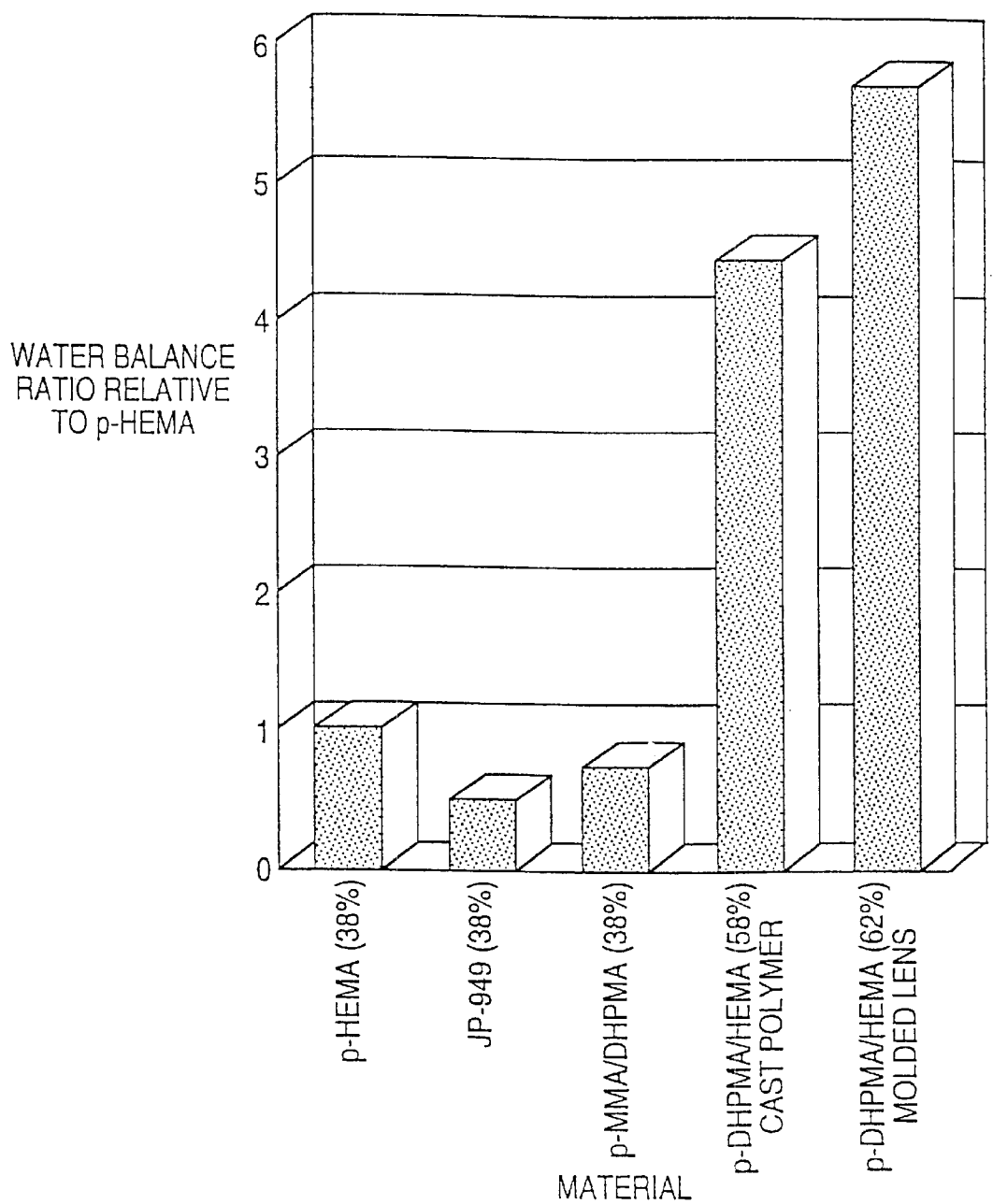
FIG. 11 is a chart that compares a molded GMA/2-HEMA lens to lenses prepared from bulk polymerized polymer.

FIG. 11 compares the molded GMA/2-HEMA lens to lenses prepared from bulk polymerized polymer. It is clear from the experimental results presented that a molded lens with improved dimensional stability can be readily made. Half molded (current example) or fully molded lens can be readily made using the current invention.

Lens Dehydration Procedure:

A clean, fully hydrated sample lens was removed from a saline vial, secured on a wire holder and blotted gently with a lint-free paper. The wire holder was hung on a balance scale, weighed and its weight recorded. The lens was dehydrated by 10% of its water weight, by means of a procedure in which a lens is weighed and its weight recorded every 10 seconds until 10% weight loss has been achieved. Dehydration occurred without the introduction of any air circulation, except that which normally takes place when the doors of the balance are open. After the 10% dehydration test is completed, the lens was returned. to the saline beaker, and allowed to rehydrate back to saturation. This procedure was repeated a minimum of 2 more times to obtain an average weight loss time.

Lens Rehydration Procedure:

A clean, fully hydrated sample lens was removed from a saline vial, secured on a wire holder and blotted gently with a lint-free paper. The wire holder was hung on the balance scale and the lens was weighed to determine the weight of the saturated lens and the weight was recorded. The lens was then allowed to dehydrate by 10% of its water weight and the weight recorded. The wire holder was removed from the scale and the lens was submerged in buffered saline at 21°±1° C. for exactly 10 seconds. The lens was removed from the saline, blotted gently with a lint-free paper and weighed. The weight and the period of hydration were recorded. After recordation, the lens was re-submerged for 10 additional seconds, blotted and the weight and cumulative period of time hydration recorded. This procedure was continued until the saturated weight of the lens is achieved.

In some instances, a given material will not return to its fully hydrated state, as a result of water lost during the brief blotting and weighing times. In this case, the lens is continuously cycled until a steady state is achieved.

The complete procedure was repeated a minimum of 3 times to obtain an average weight gain time.

Results:

The relative water balance ratio is reported as the ratio of the average time (in minutes) to dehydrate a specified, constant-thickness lens by 10% of its water weight to the average time (in minutes) to rehydrate the lens to its initial hydrated weight (saturation) from 10% of its dehydrated water weight relative to the p-HEMA control. (Water balance ratio for p-HEMA is defined to be −1).

Five lenses of different compositions were prepared. Lens #1 was constructed from a polymer of 2-hydroxyethyl methacrylate, which is commercially available as Polymacon). Lens #2 was constructed in accordance with Practical Example 1 of Japanese Patent Application Serial No. 6-88949 (hereinafter "JP '949"). Lens #3 was constructed from a copolymer of methyl methacrylate and 2,3-dihydroxypropyl methacrylate (also referred to as glyceryl methacrylate). Lens #4 represents the contact lens of the present invention and as described in Example 3 on page of the present specification. Lens #5 was constructed from a terpolyiner, containing 2, 3-dihydroxypropyl methacrylate, 2-hydroxyethyl methacrylate, and ethylene glycol dimethacrylate (EGDMA approximately 2% by weight).

Figure 8:
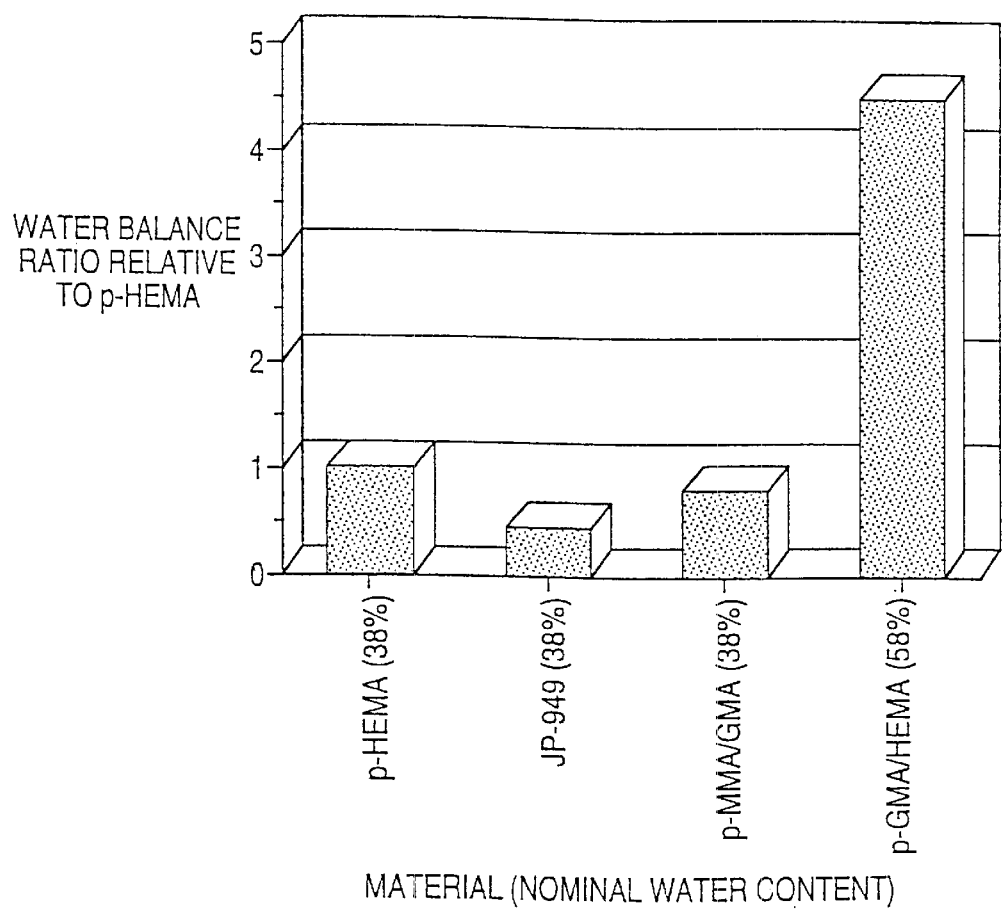
FIG. 8 is a chart illustrating the relative water balance ratio of the various materials relative to p-HEMA as a standard.
Figure 9:
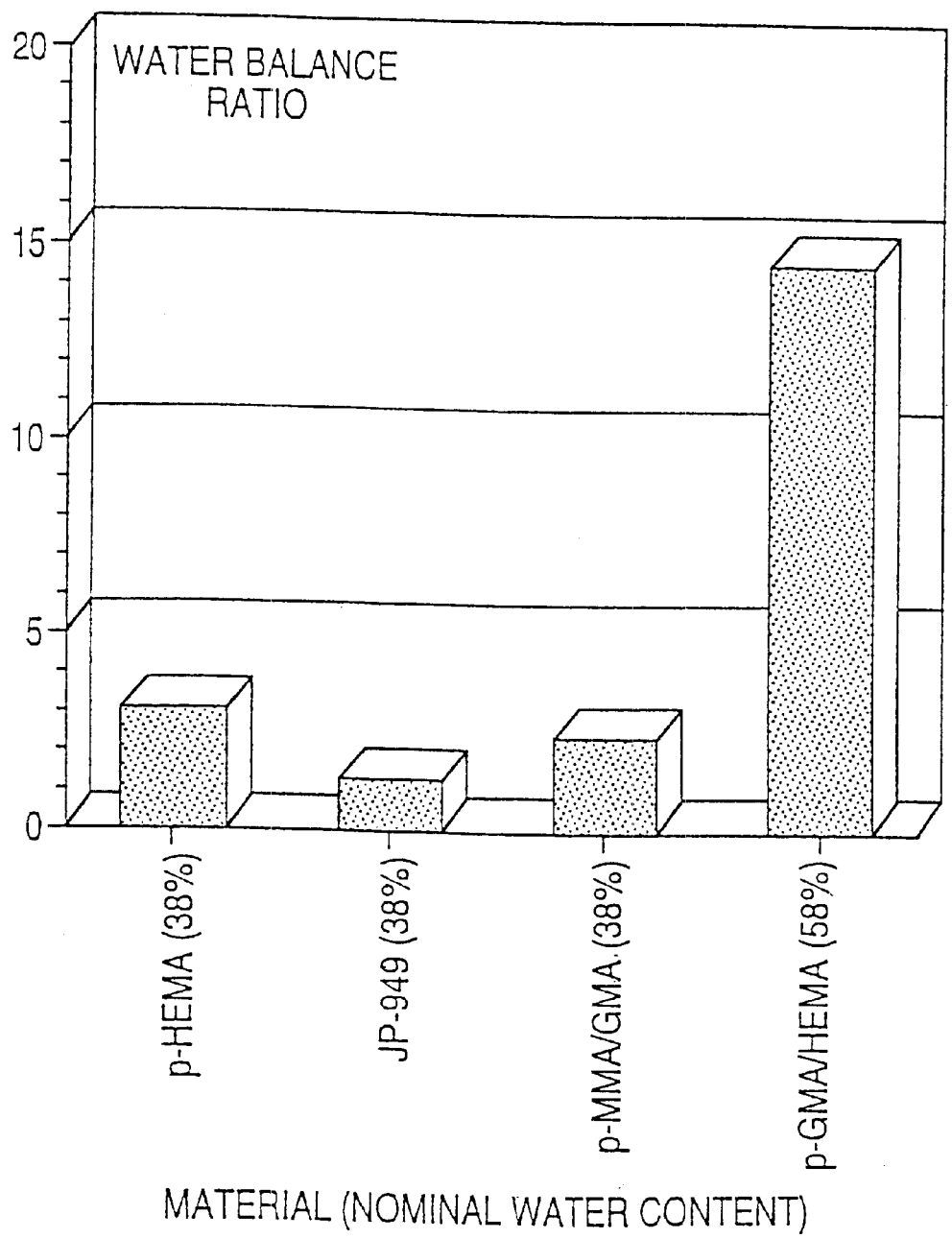
FIG. 9 is a chart illustrating the absolute water balance ratio of various materials.

The experimental results are presented in FIGS. 8, 9., and 10. The comparative data clearly demonstrates the superior water balance ratios, both absolute and relative, of the material of the present invention relative to the materials of the prior art.

Specifically, FIG. 8 indicates that the material of the present invention (identified as p-GMA/HEMA) has a relative water balance approximately 4.5 times greater than poly-HEMA and has a relative water balance ratio approximately 11 times greater that the example of JP '949. These results represent improvements of 450% and 1100%, respectively, over the prior art.

Further, FIG. 9 presents the absolute water balance ratios of the same materials identified above. From an analysis of the results presented in this chart, the superior absolute water balance of the material of the present invention is clearly evident. The present invention, identified in the chart as p-GMA/HEMA, has an absolute water balance ratio of almost 15, while the material identified in JP '949 has an absolute water balance ratio of approximately 2. This is an improvement in the absolute water balance ratio of 750% over the cited reference. Even the comparison with p-HEMA reveals an improvement of approximately 375%.

Figure 10:
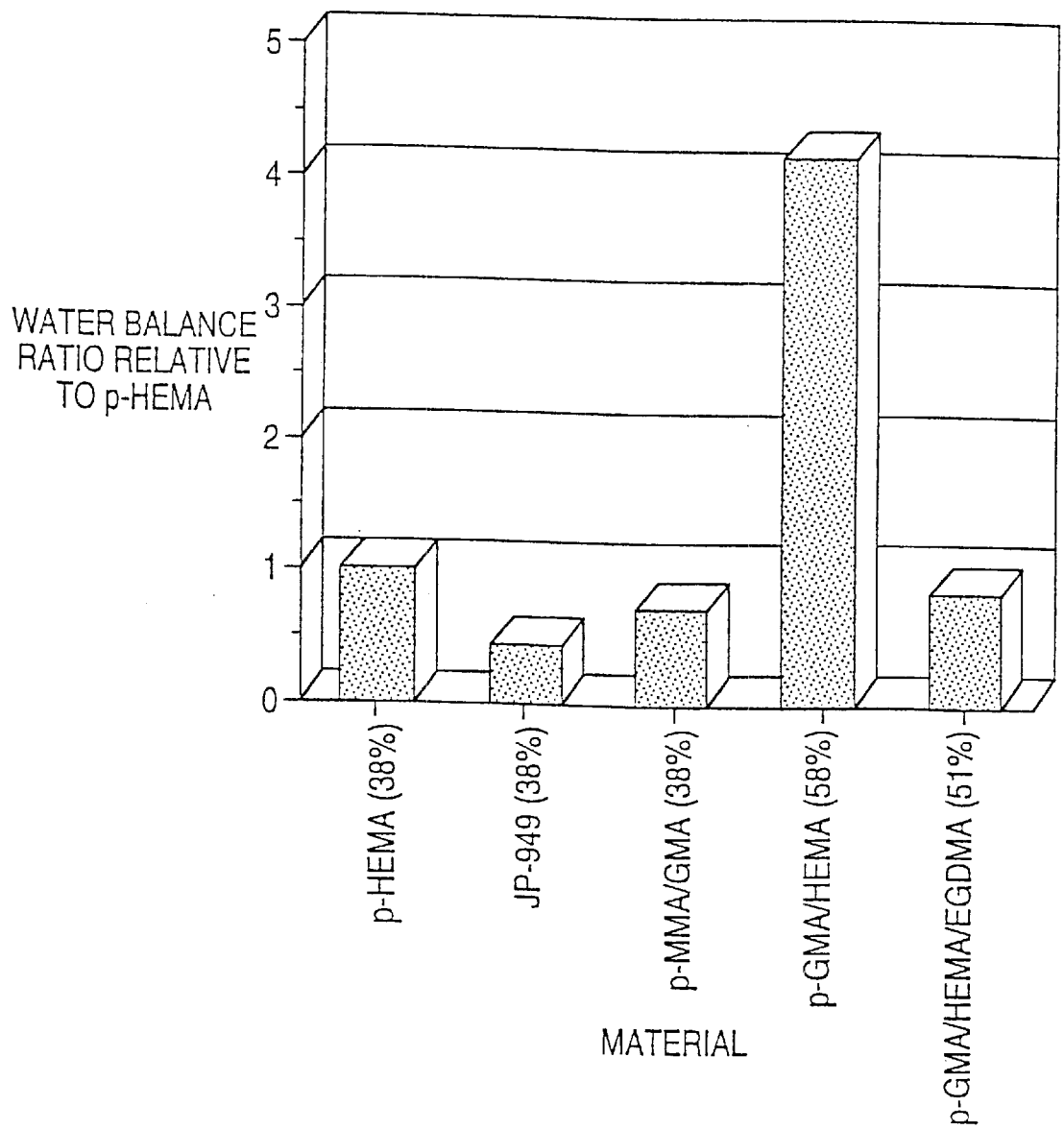
FIG. 10 is a chart illustrating the relative water balance ratio of the various lenses relative to p-HEMA as a standard.

Additionally, FIG. 10 indicates that the material of the present invention (identified as p-GMA/HEMA) has a relative water balance ratio approximately 4.5 times greater than poly-HEMA and has a relative water balance ratio approximately 11 times greater that the example of JP '949. These results represent improvements of 450% and 1100%, respectively, over the prior art. Moreover, FIG. 10 indicates that the material of the present invention has a relative water balance ratio approximately 5.3 times greater than the terpolymer of Lens #5. This result represents an improvement of 530% over the terpolymeric material.

Obviously, numerous modifications and variations of the present invention are possible in light of the above teachings. It is therefore to be understood that within the scope of the appended claims, the invention may be practiced otherwise than as specifically described herein.

What is claimed is:

1. A method of forming a contact lens blank suitable for use in forming a soft contact lens, comprising:
   providing a polymerization reaction mixture comprising monomers and a crosslinking agent, wherein the monomers consist essentially of 2,3-dihydroxypropyl methacrylate and 2-hydroxyethyl methacrylate;
   polymerizing the reaction mixture in a mold to form a molded polymerization product; and
   mechanically forming the molded polymerization product into a contact lens blank.

2. The method of forming a contact lens blank suitable for use in forming a soft contact lens according to claim 1, further comprising hydrating the molded polymerization product, wherein the hydrated polymerization product has a water content ranging from 40 to 70 percent by weight.

3. The method of forming a contact lens blank suitable for use in forming a soft contact lens according to claim 1, wherein mechanically forming the molded polymerization product comprises cutting the molded polymerization product into at least one cylinder.

4. The method of forming a contact lens blank suitable for use in forming a soft contact lens according to claim 3, further comprising heating the cylinder to form a cured contact lens blank.

5. The method of forming a contact lens blank suitable for use in forming a soft contact lens according to claim 4, wherein the cylinder is heated at a temperature of 110° C. to cure the contact lens blank.

6. The method of forming a contact lens blank suitable for use in forming a soft contact lens according to claim 4, further comprising grinding and lapping the cured contact lens blank to form a right cylinder.

7. The method of forming a contact lens blank suitable for use in forming a soft contact lens according to claim 4, wherein the cured contact lens blank has an absolute water balance ratio greater than 8.

8. The method of forming a contact lens blank suitable for use in forming a soft contact lens according to claim 1, wherein the molar ratio of 2,3-dihydroxypropyl methacrylate to 2-hydroxyethyl methacrylate in the polymerization reaction mixture ranges from 10:90 to 99:1.

9. The method of forming a contact lens blank suitable for use in forming a soft contact lens according to claim 1, wherein the monomers consist of 2,3-dihydroxypropyl methacrylate and 2-hydroxyethyl methacrylate.

10. The method of forming a contact lens blank suitable for use in forming a soft contact lens according to claim 9, wherein the contact lens blank has an absolute water balance ratio greater than 8.

11. The method of forming a contact lens blank suitable for use in forming a soft contact lens according to claim 9, wherein the contact lens blank is hydrated and has a water content ranging from 40 to 70 percent by weight.

12. The method of forming a contact lens blank suitable for use in forming a soft contact lens according to claim 9, wherein the crosslinking agent consists of ethylene glycol dimethacrylate.

13. The method of forming a contact lens blank suitable for use in forming a soft contact lens according to claim 12, wherein the polymerization reaction mixture comprises 0.6 percent by weight of the ethylene glycol dimethacrylate.

14. The method of forming a contact lens blank suitable for use in forming a soft contact lens according to claim 9, wherein the polymerization reaction mixture further comprises 2,2-azobis(2,4-dimethylvaleronitrile).

15. The method of forming a contact lens blank suitable for use in forming a soft contact lens according to claim 1, wherein the reaction mixture is polymerized at 35° C.

16. The method of forming a contact lens blank suitable for use in forming a soft contact lens according to claim 1, further comprising purifying the 2,3-dihydroxypropyl methacrylate by distillation prior to adding it to the polymerization reaction mixture.

17. The method of forming a contact lens blank suitable for use in forming a soft contact lens according to claim 1, wherein the polymerization reaction mixture further comprises 2,2-azobis(2,4-dimethylvaleronitrile).

18. The method of forming a contact lens blank suitable for use in forming a soft contact lens according to claim 1, wherein the polymerization reaction mixture further comprises water.

19. The method of forming a contact lens blank suitable for use in forming a soft contact lens according to claim 18, wherein the temperature is slowly increased during the polymerization.

20. The method of forming a contact lens blank suitable for use in forming a soft contact lens according to claim 19, wherein the temperature is slowly increased from a temperature of 45° C. during the polymerization.

\* \* \* \* \*